Nov. 24, 1964   R. L. LINCOLN   3,158,455
APPARATUS FOR SEPARATING SOLID MATERIAL FROM GAS
Filed Aug. 18, 1959   2 Sheets-Sheet 1

INVENTOR.
ROLAND L. LINCOLN
BY

Nov. 24, 1964  R. L. LINCOLN  3,158,455
APPARATUS FOR SEPARATING SOLID MATERIAL FROM GAS
Filed Aug. 18, 1959  2 Sheets-Sheet 2

INVENTOR.
ROLAND L. LINCOLN

United States Patent Office 3,158,455
Patented Nov. 24, 1964

3,158,455
APPARATUS FOR SEPARATING SOLID
MATERIAL FROM GAS
Roland L. Lincoln, Allentown, Pa., assignor to Fuller
Company, a corporation of Delaware
Filed Aug. 18, 1959, Ser. No. 834,531
8 Claims. (Cl. 55—292)

The present invention relates to the separation of solid material from gases and is concerned more particularly with the filtering of dusts from gases and the cleaning of the filtering surfaces by means of generated pressure waves and reverberations thereof.

Previous dust collectors employing tubular filter bags have included both large, flat-walled casings for containing and supporting the bags and complex means such as mechanical rappers or shakers for removing accumulated dust from the filtering surfaces. These flat-walled structures require substantial bracing to strengthen the walls against destructive flexing under the pressures encountered. Furthermore, the wind resistance of such structures complicates the mounting and bracing of the collectors when it is desired to conserve ground or floor space by extending the collector to substantial heights above the ground or other mounting base.

The removal of accumulated dust from filter bag surfaces by mechanical rapping, shaking or vibration has been effective for cleaning the bags, but has also been found to shorten the life of the bags because of the mechanical stresses involved. This problem is magnified when the dust collector is used in services including hot or corrosive gases.

More recently, it has been proposed to employ a sound generator to induce vibration of the filtering surfaces and a consequent removal of accumulated dusts.

However, none of the expedients employed heretofore have been found entirely satisfactory.

The present invention provides a dust collecting unit comprising a filtering chamber portion having an inlet and an outlet, filtering means interposed between the inlet and outlet and uniformly distributed with respect to the cross sectional area of the chamber portion, reverse flow means for stressing the filtering means and flushing dust therefrom, and wave generating means in the region of the longitudinal center of the filtering means and the cross-sectional center of the chamber portion for inducing dust-releasing vibrations in the stressed filtering means.

In general, the preferred form of apparatus of the present invention, as embodied in a dust collector, comprises a plurality of substantially cylindrical chambers in an upright position and each having a cylindrical side wall, a top wall, an inlet and a clean gas outlet. A crown sheet having a plurality of apertures substantially uniformly distributed therein in concentric, annular series divides each chamber into a relatively small upper compartment and a large lower compartment closed at its lower end by a material-receiving hopper having pressure-lock discharge means such as a rotary feeder for removing material therefrom.

A plurality of filter bags are secured as a group to the crown sheet in individual communication with the apertures therein, and extend downwardly in the lower compartment. A lower group of bags is secured to and in individual communication with the bags of the first group by means of a plurality of individual, intermediate couplings mounted on a frame supported by the wall of the chamber. The lower ends of the bags of the lower group are secured to a second crown sheet having a corresponding plurality of apertures therein and forming a wall between the respective interiors of the lower compartment and the material-receiving hopper.

A plurality of wave generators, preferably in the form of sound generators, such as horns or whistles, are individually positioned along the axis of the cylindrical chambers at the longitudinal center of each group of bags.

Means are provided for stressing the filter bags during operation of the wave generators such as a conduit system effecting a reverse flow of clean air through the filter bags during the bag-cleaning period.

The upper compartments of the chambers receive individual branch ducts communicating by way of individual valves with a supply duct which in turn communicates with a source of dusty gas such as a cement kiln. A hopper or other suitable means is provided for removing dust which settles out of the gas streams in the supply duct.

A flow of such gas through the duct collector is forced by a suitable fan drawing gases from the source of dusty gas for delivery under pressure through the supply duct and branch ducts to the chambers.

Each chamber is provided with a short exhaust stack which communicates with the portion of the lower compartment on the exterior of the bags by way of a central aperture in the upper crown sheet and extends therefrom upwardly through the upper compartment to open to the atmosphere.

A better understanding of the invention may be derived from the accompanying drawings and description, in which.

Figure 1:
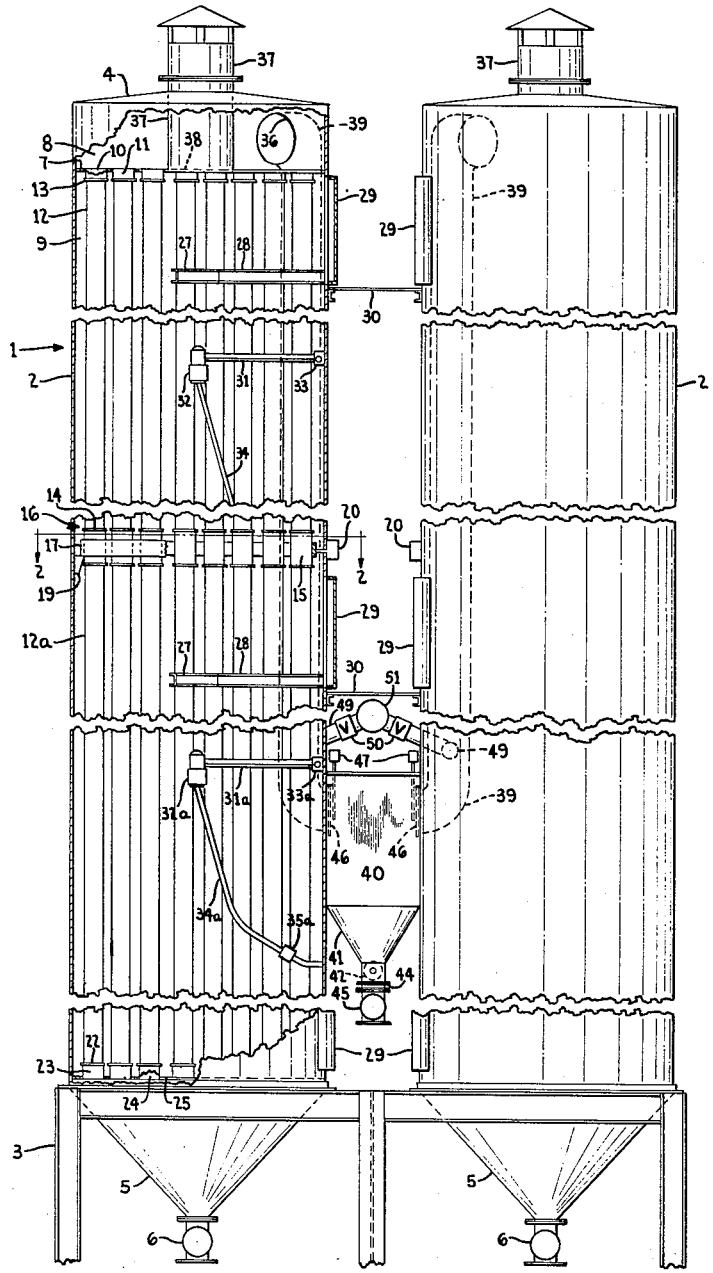
FIG. 1 is an end view, partly in section, of a dust collecting installation embodying the invention.
Figure 4:
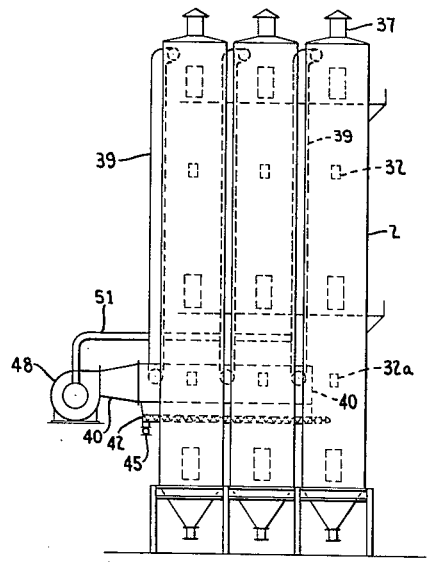
FIG. 4 is a side view of the installation on a reduced scale.
Figure 3:
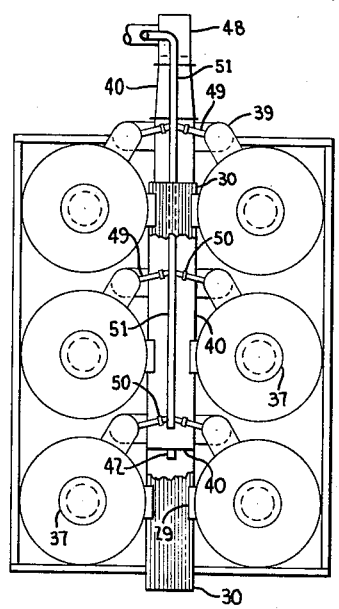
FIG. 3 is a plan view of the full installation on a reduced scale.

As shown in FIGS. 1 to 4, the dust collector of the invention comprises a plurality of upright substantially cylindrical chambers 1 each comprising a steel cylindrical wall 2 supported by a suitable base 3. While cylindrical chambers are shown and are preferred, other forms may be employed. Each chamber 1 is closed at its upper and lower ends by an individual top wall 4 and an individual material-receiving hopper 5, respectively. The hoppers 5 are provided with individual discharge valves 6.

Below and spaced from the top wall 4 of each cylindrical chamber, a transverse crown sheet 7 divides the chamber into a relatively small supply chamber or upper compartment 8 and a filter chamber or lower compartment 9. The crown sheet 7 has a plurality of apertures 10 distributed uniformly over an annular zone thereof, leaving a free central area therein as described more fully hereinafter. Each aperture is fitted with a surrounding collar 11 extending downwardly into the lower compartment 9.

A plurality of tubular filter bags 12 are individually secured by suitable means such as clamps 13 to the collars 11 so that the interior of each bag communicates with an aperture 10. The filter bags 12 are of uniform length and are secured under substantially uniform longitudinal tension at their lower ends by clamps 14 about a plurality of intermediate, tubular collars 15 carried by a perforate or skeletal transverse frame assembly 16. The frame assembly 16 comprises a plurality of concentric hoops 17 secured to the collars 15 and secured to each other by radial bars 18. The assembly is supported on the wall 2 by any suitable means such as a plurality of inwardly-extending projections 19 supporting the outermost hoop. In certain difficult installations, an individual mechanical agitator or vibrator 20 is provided for and operatively coupled to each frame assembly 16. The vibrators 20 preferably are arranged to vibrate the respective frame assemblies in a horizontal direction and are adjustable in frequency.

A plurality of tubular filter bags 12a form a lower bag group and are individually secured about the lower ends of the intermediate collars 15 by clamps 21. The bags 12a extend downwardly from the collars and are secured at their lower ends by clamps 22 to individual collars 23 about apertures 24 of a second crown sheet 25 positioned at the lower end of the lower compartment 9. Additional groups of bags may be employed, where desired, by increasing the height of the cylindrical casing and by the provision of additional intermediate frame assemblies and bag groups between the upper and lower crown sheets. Alternatively, additional completely equipped cylindrical chambers may be used if sufficient floor space is available.

Figure 2:
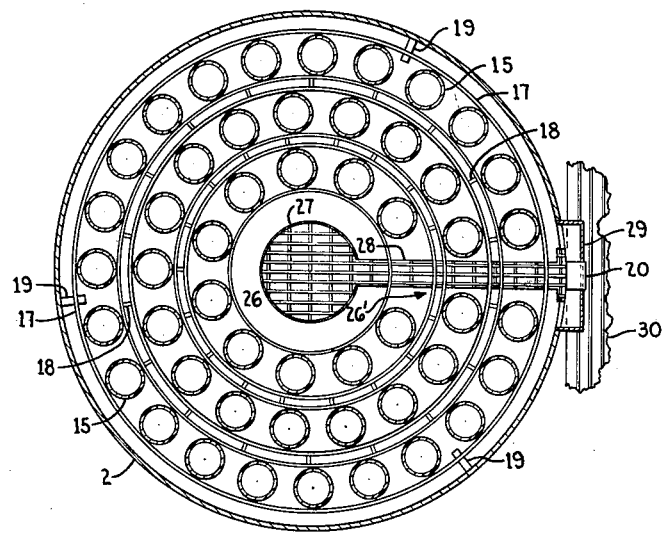
FIG. 2 is an enlarged sectional view taken along the lines 2—2 of FIG. 1.

The apertures 10, intermediate collars 15 and apertures 24 are so aligned as to hold the bags 12 and 12a in a substantially uniform arrangement of circular subgroups each concentric with the cylindrical wall 2 and providing an open central zone 26 extending longitudinally of the lower compartment, as shown in FIG. 2.

The cross sectional uniformity of the filter bag arrangement may be slightly disrupted to provide a minimum radial passage 26' from the longitudinal central zone to the exterior of the chamber. Within working distance of the collars 11, 15, and 23, central working platforms 27 are positioned in the open central zone 26 with a narrow walkway 28 extending therefrom radially through the passage 26' to the wall 2. Access doors 29 are provided in the cylindrical wall adjacent each of the walkways, and open onto catwalks 30 extending between the rows of chambers.

A plurality of mounts 31, 31a within the radial passage 26' carry a corresponding plurality of wave generators 32 and 32a, such as whistles or horns or any other suitable generator. The wave generators 32, 32a are each positioned along the axis of a cylindrical chamber at approximately the longitudinal center of one group of bags, and preferably are adjustable in frequency. As shown on the drawings, the wave generators 32 and 32a are associated with bag groups 12 and 12a, respectively. Where a greater number of superimposed bag groups are employed, a corresponding number of wave generators are provided. Also, where desired for greater wave intensity, or for any reason, a plurality of generators may be used in association with each bag group.

The mounts 31, 31a are secured to the chamber wall by hinges 33 and 33a, respectively, which permit the mounts and wave generators to swing downwardly. The wave generators 32, 32a are held in their normal elevated position by pipes 34 and 34a, respectively, which extend downwardly therefrom to within working distance of the next lower platform, and are secured to the chamber wall. The pipes 34 and 34a may serve as conduits for compressed air or electrical cables leading to the generators. The pipes 34, 34a preferably have quick-disconnect means such as a union fitting 35, 35a, respectively, to permit lowering of the wave generators on the hinges for maintenance or repairs.

Each chamber has an inlet 36 for dusty gas which communicates with the upper compartment 7 thereof, and an outlet for cleaned gas comprising an exhaust stack 37 open to the atmosphere and extending downwardly through the center of the top wall 4 and upper compartment 8 to communicate with an outlet opening 38 in the crown sheet 7. The outlet opening 38 is positioned in the free central area of the crown sheet surrounded by the annular zone containing the apertures 10, thereby providing for communication of the exhaust stack 37 with the exterior or clean side of the bags 12 and 12a.

The upper compartment 8 of each chamber need not be cylindrical and may take any form suitable for distributing the dusty air, but is more conveniently arranged as an extension of the substantially cylindrical portion housing the bags. The inlet 36 of each upper chamber receives an individual branch duct 39 communicating with a common supply duct 40. The bottom of the portion of supply duct from which the branch ducts extend is formed as a hopper 41 provided with a screw conveyor 42 leading to a discharge outlet 44 closed by a rotary feeder 45. At the junction of each of the branch ducts 39 with the supply duct 40, is a valve 46 operated by suitable means such as a motor, ram, or a pneumatic cylinder 47 which is arranged to close off the associated branch duct, and is regulated by a suitable manual or automatic control system not shown.

The supply duct 40 communicates with the outlet of a fan 48 adapted to draw hot dusty gas from a rotary kiln or any other source (not shown) for forced-draft delivery under pressure through the supply duct, branch ducts and cylindrical chambers. Alternatively, the fan may be arranged, with suitable ducting, to draw clean gas from the clean side of the bags as an induced draft system, in which case the supply duct 40 would communicate directly with the dust source. Where required for either arrangement, suitable means (not shown) may be provided for reducing the gas temperature prior to its entry to the fan or chambers.

The branch ducts 39 each receive one of a plurality of branch conduits 49 having individual valves 50 therein. Each of the valves 50 preferably is arranged to open in association with or in response to the appropriate cylinder 47 for closing the associated valve 46 in the branch duct. The branch conduits 49 each communicate on the side of the valve 50 remote from the branch ducts 39 with a main conduit 51, which, in turn, communicates with the intake side of the fan. Alternatively, the reverse flow may be accomplished, in the forced draft system shown, by the use of a pressurized source. In this case the conduits supplying the flushing gas will necessarily communicate with the clean air chamber 9 so that the gas will pass through the bags to be cleaned in the reversed direction from the gas flow during the filtering period. Other reverse flow arrangements may be used, if desired.

In operation, the valves 46 are opened and the fan 48 is started, thereby delivering dusty kiln gases under pressure through the supply duct 40, the several valves 46 and branch ducts 39 and the inlet 36 to the several upper compartments 7. Dust which settles out of the gas stream in the supply duct or branch ducts falls to the hopper 41 for discharge by the screw conveyor 42 through the discharge outlet 44.

The gases pass from the upper compartment 8 downwardly through the apertures 10 and collars 11 to the interior of the filter bags 12. A portion of the gas within each bag 12 passes through the wall thereof, while the remaining portion continues downwardly through the intermediate collars 15 and into the associated lower bag 12a and passes through the wall thereof. The fine particles and a substantial portion of the total dust originally entrained in the gases are filtered therefrom on the walls of the filter bags 12 and 12a, while the remaining larger and heavier particles or agglomerates continue downwardly through the collars 23 and apertures 24 to pass directly to the material-receiving hopper 5.

After passing out through the walls of the bags 12 or 12a, the cleaned gas flows upwardly through the lower compartment 9 on the outer side of the bags and is exhausted to the atmosphere through the outlet opening 38 and exhaust stack 37.

When the accumulated deposit of dust on the filter bags becomes excessive or reaches a predetermined maximum, which may be measured, for example, in terms of excessive pressure drop across the combined fabric and dust accumulation thereon, the valve 46 for at least one of the chambers is closed, and the associated wave generators 32 and 32a are started. The paired generators of the several chambers may be started or operated in unison or in any sequence desired.

The pressure waves given off by the generators induce a pattern of vibrations in the filter bags of low amplitude, or very small lateral displacement, in response to the alternate high- or low-pressure portions of each passing wave and without fatiguing mechanical contact with the fabric. The accumulated dust is loosened by the vibrations and falls to the associated hopper 5 to be removed through the valved outlet 6.

As the filter bags first respond to the effect of the generated waves, they are prone to start vibrating, initially and momentarily, at a frequency less than their ultimate frequency, and then to increase in frequency very quickly to the desired level. While this effect, to a certain extent, is beneficial to the cleaning of the bags, it may tend to cause momentary, large amplitude flexing of the bags between the fixed ends thereof and a consequent fatiguing of the fabric. However, the preferred arrangement of relatively short bags 12, 12a coupled to the common framework 16 limits the amplitude of motion of each bag. Therefore, the fatiguing effect at the fastening points of the bags is limited during such momentary periods of low frequency vibration by the snubbing or dampening effect of the common framework.

Preferably, the flushing or reverse air flow system is employed simultaneously with the wave generators. In this case, the valve 50 in the branch conduit 49 associated with the isolated chamber is opened in conjunction with, or as the case may be, in response to the closing of the valve 46. The reduced pressure at the inlet of the fan 48 then draws atmospheric air serially through the stack 37, outlet opening 38, lower compartment 9, bags 12 and 12a, upper compartment 8, inlet 36, branch conduit 39, and the branch conduit 49 and main conduit 51 to the fan.

The reverse flow of air through the fabric of the filter bags pre-stresses the fabric and dislodges the dust accumulated on the filtering surface thereof, generally in agglomerates or cakes, which dust then falls through to the material-receiving hopper, while residual, fine dust entrained from the filtering surface by the flushing air either is settled out in the branch duct 39 for removal via the hopper 41, or is carried back by the increased velocity of the air in main conduit 51 to the intake of the fan 48.

The moderate, generally constant stress or tension imparted to the bags by the substantially even reverse flow of air causes the bags to be more susceptible to the induction of vibrations therein by the generated waves. Without the excessive wave energy absorption characteristic of slack fabric areas such as is exhibited by sound proofing drapes or wall hanging, the bags attain the desired vibration with a minimum loss or attenuation of the wave energy.

The concentric bag grouping and the positioning of the wave generators in the region common to both the axis of the chamber and the longitudinal center of the bag groups is particularly advantageous. The greater part of the force or wave energy imparted to the bags is delivered in the middle region of the long bags at the point most remote from the couplings, thereby minimizing the fatiguing effect at the junction of each bag with its couplings.

A substantial portion of the energy of each wave will be absorbed by the bags nearest the generator. However, the remaining waves which reach the cylindrical wall of the chamber, although attenuated by such absorption, reflect from the steel wall in an inward direction generally opposite their original direction. The waves thus reflected again impinge on the bags, meeting the outermost bags first and thereby supplying additional impulsive force to those bags most remote from the generator. Where the chamber wall is cylindrical, as shown, the waves will be reflected back most effectively and toward the generator-source.

The optimum frequency of the generated waves is dependent on such variables as the size and number of bags between the generator and the cylindrical steel-wall reflector, the amount of dust to be accumulated on the bags between cleanings, the longitudinal tension of the bags as installed, and the degree of pre-stressing or tensioning of the bags by the reverse flow of cleaning gas. Therefore, variable frequency generators are preferred so that the optimum frequency may be established in operation for each installation.

Within the broad satisfactory range of from fifty to five thousand cycles per second output of the wave generators, a frequency of from one hundred to five hundred cycles per second is preferred.

Where particularly difficult, tenacious dusts are to be removed from the bags, the auxiliary vibrators 20 are operated, preferably concurrently with the operation of their associated wave generators and in the frequency range of from 5 to 75 cycles per second. In such cases, the combined vibrations induced by the wave generators and conducted from the vibrators are particularly effective in dislodging the accumulated dusts from the bag surfaces. The greater part of the vibration of the bag surfaces is induced by the wave generators, and, characteristically, is of substantial frequency but very low amplitude. The auxiliary vibrations conducted by the vibrators 20 may be of much less magnitude than would be required if mechanical vibrators were used alone, thereby reducing any tendency of the vibrators to fatiguing of the bags. Preferably, the auxiliary mechanical vibrations are of different phase than the primary or wave-inducted vibrations, and therefore disturb or interfere in frequency with the primary vibration pattern which tends to be established in the filter bags. The disturbance loosens dust accumulations or agglomerates adhering to the bags which are otherwise able to follow the primary vibration pattern of the fabric. The vibrators may be adjusted in frequency to produce the optimum disturbance for each installation.

Various changes may be made in the details of the invention as disclosed without sacrificing the advantages thereof or departing from the scope of the appended claims.

I claim:

1. A gas-material separator comprising a cylindrical chamber having an inlet and an outlet, filter means in the chamber interposed in the gas-material flow path between the inlet and the outlet, a wave generator in a region intermediate the length of the filter means and in the region of the cross sectional center of the filter means, said filter means being distributed substantially uniformly and arcuately with respect to the cross sectional area of the chamber and concentrically with respect to the cylindrical chamber and the wave generators, and means for causing a flow of gas successively through the inlet, the filter means and the outlet.

2. A gas-material separator according to claim 1 in which the filtering means comprises a plurality of tubular filter bags arranged in at least one circular group.

3. A gas-material separator comprising a chamber having an inlet and an outlet, filter means in the chamber interposed in the flow path of the gas-material between the inlet and the outlet, said filter means being distributed substantially uniformly with respect to the cross sectional area of the chamber, a wave generator in a region intermediate the length of the filter means and in the region of the cross sectional center of the filter means, and means for causing a flow of gas succesively through the inlet and the filter means to the outlet, which comprises a fan, a gas-material supply duct communicating with the inlet of the chamber and with the discharge of the fan, a valve in the duct, and a conduit communicating at one end with the duct at a point intermediate the valve therein and the inlet to the chamber, said conduit communicating at its other end with the intake of the fan, a valve in the conduit, the valve in the conduit being openable when its associated duct valve is closed to cause a reverse flow of gas through said filter means.

4. A gas-material separator comprising a generally vertically extending chamber having an inlet and a gas outlet, a plurality of relatively short tubular filter bags interposed between the inlet and gas outlet and arranged as a plurality of substantially circular bag groups uniformly distributed in the chamber, at least one of the bag groups being superimposed on and aligned with another of the bag groups, common coupling means individually joining bags of the adjacent superimposed bag groups, a wave generator positioned in the regions common to both the axial and longitudinal centers of each bag group, a crown sheet extending across the chamber in the upper region thereof and forming at least in part a supply chamber, said crown sheet having a plurality of apertures therein, the upper ends of the tubular filter bags of the upper bag group communicating individually with the apertures, a second crown sheet below said first crown sheet and having a plurality of apertures therein, the lower ends of the filter bags of the lower bag group communicating individually with the apertures of the second crown sheet, a material-receiving hopper below said second crown sheet, said inlet communicating with said supplyc hamber, an outlet opening in the first crown sheet, and an exhaust stack communicating with the outlet opening and the atmosphere.

5. A dust collector comprising a plurality of substantially upright chambers each having an inlet and a gas outlet, filtering means interposed between the inlet and gas outlet of each chamber, a plurality of branch ducts individually communicating with the inlets of the chambers, a supply duct communicating with the branch ducts at the ends thereof remote from the chamber inlets, a fan communicating at its discharge with the supply duct, a valve in each branch duct, a plurality of branch conduits communicating individually with the branch ducts intermediate the valve therein and the point of communication with the chamber inlet, a main conduit communicating with the branch conduits and with the intake of said fan, and a valve in each branch conduit, the valves in the branch conduits being openable when their respective associated branch duct valves are closed.

6. A dust collector comprising a chamber having an inlet thereto and a gas outlet, a filtering medium in the chamber in the path of gas flow from the inlet to the outlet of the chamber, a fan, a duct communicating at one end with the inlet to the chamber and at its other end with the discharge of the fan for conducting a stream of gas from the fan to the chamber, a valve in the duct for shutting off the supply of gas from the fan to the chamber, a conduit communicating at one end with the duct at a point intermediate the valve therein and the inlet to the chamber, and at its other end with the intake of said fan, and a valve in the conduit, the valve in the conduit being openable when the duct valve is closed, whereby a reverse flow of gas through the chamber may be obtained.

7. A dust collector as set forth in claim 6 including a wave generator within the chamber for inducing vibrations in the filtering medium.

8. A dust collector comprising a substantially cylindrical chamber having an inlet and a gas outlet, filtering means comprising a plurality of filter bags interposed between the inlet and gas outlet of the chamber and substantially uniformly distributed with respect to the cross-sectional area of the chamber, gas-supply means for passing a stream of gas through the inlet, filter bags and gas outlet of the chamber, means for stopping the supply of gas through said filter bags and for causing a reverse flow of a gas through the filter bags, and wave generating means centrally positioned with respect to the filter bags in both the cross-sectional and longitudinal directions for inducing vibrations in the filtering medium, said gas-supply means including a fan and a duct communicating with the inlet of the chamber and with the discharge of the fan, and which includes a valve in the duct, a conduit communicating at one end with the duct at a point intermediate the valve therein and the inlet to the chamber, said conduit communicating at its other end with the intake of the fan, and a valve in the conduit, the valve in the conduit being openable when the duct valve is closed.

References Cited in the file of this patent

UNITED STATES PATENTS

| 555,874 | Morse | Mar. 3, 1896 |
| 1,509,912 | Stebbins | Sept. 30, 1924 |
| 2,031,030 | Brizard | Feb. 18, 1936 |
| 2,413,499 | Hulton | Dec. 13, 1946 |
| 2,626,011 | Campbell | Jan. 20, 1953 |
| 2,729,304 | Swanson | Jan. 3, 1956 |
| 2,758,671 | Silverman et al. | Aug. 14, 1956 |
| 2,769,506 | Abboud | Nov. 6, 1956 |
| 2,781,104 | Fischer | Feb. 12, 1957 |
| 2,845,140 | Luhr | July 29, 1958 |
| 2,854,091 | Roberts et al. | Sept. 30, 1958 |

FOREIGN PATENTS

| 700,782 | Great Britain | Dec. 9, 1953 |
| 903,890 | Germany | Feb. 11, 1954 |